(12) United States Patent
Hama

(10) Patent No.: US 8,033,972 B2
(45) Date of Patent: Oct. 11, 2011

(54) ROLLER, MOVING UNIT AND METHOD OF PRODUCING ROLLER

(75) Inventor: Tomio Hama, Okaya (JP)

(73) Assignee: Yugen Kaisha Hama International, Nagano (JP)

( * ) Notice: Subject to any disclaimer, the term of this patent is extended or adjusted under 35 U.S.C. 154(b) by 1026 days.

(21) Appl. No.: 11/976,052

(22) Filed: Oct. 19, 2007

(65) Prior Publication Data

US 2008/0120845 A1    May 29, 2008

(30) Foreign Application Priority Data

Nov. 29, 2006    (JP) .................................. 2006-322094

(51) Int. Cl.
*A01B 29/00* (2006.01)

(52) U.S. Cl. ......................... 492/28; 29/895.32; 384/283

(58) Field of Classification Search .................. 384/129, 384/215, 217, 275–276, 280, 283, 416, 418, 384/419; 492/16–20, 28, 30–37, 48, 56–60; 264/265; 29/895, 895.32

See application file for complete search history.

(56) References Cited

U.S. PATENT DOCUMENTS

| | | | |
|---|---|---|---|
| 1,456,458 A * | 5/1923 | Nordell | 492/48 |
| 2,320,541 A | 4/1941 | Wilson | |
| 2,793,571 A * | 5/1957 | McLeod et al. | 492/56 |
| 3,514,829 A * | 6/1970 | Blatt | 492/56 |
| 3,987,539 A | 10/1976 | Gravener | |
| 4,038,731 A * | 8/1977 | Hill | 492/56 |
| 4,098,631 A * | 7/1978 | Stryjewski | 156/221 |
| 4,219,240 A * | 8/1980 | Brandenstein et al. | 301/5.7 |
| 5,226,469 A * | 7/1993 | Matsumura et al. | 164/111 |
| 5,233,719 A * | 8/1993 | Young et al. | 15/179 |
| 5,451,198 A * | 9/1995 | Lancaster | 492/48 |
| 5,679,743 A * | 10/1997 | Hirai et al. | 525/88 |
| 5,798,155 A * | 8/1998 | Yanagawa et al. | 428/35.8 |
| 5,996,775 A * | 12/1999 | Hendrickx | 198/780 |
| 6,109,792 A * | 8/2000 | Koenig | 384/282 |
| 6,645,415 B2 * | 11/2003 | Takatsu | 264/262 |
| 7,261,031 B2 * | 8/2007 | Hama | 92/19 |
| 2001/0053257 A1 | 12/2001 | Takatsu | |
| 2004/0057643 A1 * | 3/2004 | Blanchard et al. | 384/276 |
| 2005/0252371 A1 * | 11/2005 | Hama | 92/261 |

FOREIGN PATENT DOCUMENTS

| | | |
|---|---|---|
| EP | 1 591 695 A3 | 11/2005 |
| JP | U49-23679 A | 2/1974 |
| JP | U52-122482-4 | 9/1977 |
| JP | 62-227803 | 10/1987 |
| JP | 7-238939 A | 9/1995 |
| JP | 11-351249 A | 12/1999 |
| JP | 2000-120672 A | 4/2000 |
| JP | 2003-267281 A | 9/2003 |

(Continued)

*Primary Examiner* — David Bryant
*Assistant Examiner* — Jacob Cigna
(74) *Attorney, Agent, or Firm* — Birch, Stewart, Kolasch & Birch, LLP

(57) ABSTRACT

The roller can be suitably used for a guide section of a moving unit capable of moving a heavy matter without enormously increasing rigidity of a rail and is capable of reducing weight and production cost of the moving unit. The roller comprises: a tubular core having an outer circumferential face, in which a groove section is formed; and a resin coat section continuously coating the outer circumferential face of the tubular core, an inner face of the groove section, both ends of the tubular core and at least parts of an inner circumferential face thereof.

11 Claims, 8 Drawing Sheets

FOREIGN PATENT DOCUMENTS

| | | |
|---|---|---|
| JP | 2003-307961 A | 10/2003 |
| JP | 2004-85628 A | 3/2004 |
| JP | 2006-46472 A | 2/2006 |
| JP | 2006-138334 A | 6/2006 |

* cited by examiner

ROLLER, MOVING UNIT AND METHOD OF PRODUCING ROLLER

CROSS-REFERENCE TO RELATED APPLICATIONS

The present application claims priority under 35 USC 119 to Japanese Patent Application No. 2006-322094 filed on Nov. 29, 2006 the entire contents of which are hereby incorporated by reference.

BACKGROUND OF THE INVENTION

1. Field of the Invention

The present invention relates to a roller of a moving body, which rolls on a rail so as to move the moving body along the rail, a moving body having the roller, and a method of producing the roller.

2. Description of Background Art

A conventional roller (roller unit) used in a linear drive unit is disclosed in Japanese Patent Gazette No. 2000-120672. The conventional roller is shown in FIG. 8.

As shown in FIG. 8, the roller unit has a roller member 69, which further acts as an outer retainer. The roller member 69 is made of ceramic and has an outer circumferential face including a rolling face 69c, which contacts a guide face of a linear motion mechanism. Orbital faces 69a and 69b for guiding spherical bodies (balls) 67 are formed in an inner circumferential face of the roller member 69.

Inner retainers 62 and 63 of the roller unit are fitted to one end of a fixed shaft 61. The balls 67 are held between the roller member 69 and the inner retainers 62 and 63. With this structure, the roller member 69 can be freely rotated.

Japanese Patent Gazette No. 2000-120672 further discloses a roller unit including a roller member made of a ferrous material, which contacts a rail (see paragraph 0002 and FIG. 2).

The roller member, whose surface contacting the rail is composed of ceramic or metal, has superior rigidity and abrasion resistance. Therefore, in case of linearly conveying a heavy matter, e.g., 50 kg-several hundred kg, the heavy matter can be smoothly linearly moved without deforming the roller member.

In case of linearly moving a light matter, e.g., 20 kg or less, the surface of the roller member may be composed of synthetic resin.

Japanese Patent Gazette No. 11-351249 discloses a roller unit for linearly moving a relatively light matter, e.g., a slide door of an automobile. A surface of a roller is composed of synthetic resin. The roller unit is shown in FIG. 9.

In the roller unit A shown in FIG. 9, a metallic roller bearing 82 is attached to a shaft 81. Circular grooves 89 are formed in an outer circumferential face of an outer retainer 85 of the roller bearing 82, and a resin coat section 83 composed of synthetic resin is formed, by insert molding, so as to continuously cover the outer circumferential face of the outer retainer 85 and both end faces thereof.

The roller unit A shown in FIG. 9 has the resin coat section 83, which contacts a rail, so that a moving body can be smoothly guided. Further, the circular grooves 89 are formed in the outer circumferential face of the outer retainer 85 and the resin coat section 83 engages with the circular grooves 89, so that the resin coat section 83 can be securely fitted to the roller bearing 82.

However, in the conventional roller shown in FIG. 8, the surface of the roller is composed of ceramic or metal, so the rail will be easily abraded or damaged by the roller. To solve this problem, rigidity of the rail must be increased. By increasing the rigidity of the rail, weight and production cost of the roller unit must be increased.

On the other hand, in the conventional roller shown in FIG. 9, if the roller unit is used to linearly move a heavy matter, e.g., 50 kg-several hundred kg, the resin coat section 83 is deformed by the weight of the heavy matter. By deforming the resin coat section 83, dynamic resistance of the moving unit must be enormously increased and the resin coat section 83 will be detached from the circular grooves 89 or broken.

Generally, a roller having a resin coat section has problems of easily deforming, detaching and breaking the resin coat section, so the roller is not suitable for moving heavy matters.

SUMMARY OF THE INVENTION

The present invention was conceived to solve the above described problems. An object of the present invention is to provide a roller, which can be suitably used for a guide section of a moving unit capable of moving a heavy matter without enormously increasing rigidity of a rail and which is capable of reducing weight and production cost of the moving unit, a moving unit having the roller, and a method of producing the roller.

The inventors of the present application have studied and found that deformation of a resin coat section can be restrained and load applied to a rail can be reduced by coating a surface of a high rigidity core with an extremely thin resin coat section securely attached thereto even if heavy weight is applied to the roller.

Namely, the roller of the present invention comprises:

a tubular core having an outer circumferential face, in which a groove section is formed; and a resin coat section continuously coating the outer circumferential face of the tubular core, an inner face of the groove section, both ends of the tubular core and at least parts of an inner circumferential face thereof.

With this structure, the resin coat section continuously coats not only the outer circumferential face and the parts of the inner circumferential face of the tubular core but also the inner face of the groove section, so that the resin coat section is not detached or peeled from the tubular core even if the resin coat section is extremely thin.

In the roller, a width of an inner part of the groove section may be wider than that of an opening part thereof. With this structure, the groove section bites the resin coat section, so that the resin coat section can be securely engaged with the tubular core.

In the roller, a plurality of the groove sections may be arranged in the circumferential direction of the tubular core and extended in the axial direction thereof, and a length of each of the groove sections may be shorter than that of the tubular core. With this structure, the groove sections are extended, in parallel, in the axial direction of the tubular core, so shifting the resin coat section in the circumferential direction with respect to the tubular core can be prevented. Further, the length of each of the groove sections is shorter than that of the tubular core, so the groove sections are ended at mid positions in the axial direction. Therefore, shifting the resin coat section in the axial direction with respect to the tubular core can be prevented.

In the roller, a plurality of the groove sections may be arranged in the circumferential direction of the tubular core and extended in the axial direction thereof, the groove sections may be constituted by first groove sections, which are provided on the one end side, and second groove sections, which are provided on the other end side, and the first groove sections and the second groove sections may be alternately arranged in the circumferential direction of the tubular core. With this structure, the groove sections are extended, in parallel, in the axial direction of the tubular core, so shifting the resin coat section in the circumferential direction with respect to the tubular core can be prevented. Further, the first groove sections, which are provided on the one end side, and the second groove sections, which are provided on the other end side, are alternately arranged in the circumferential direction, so shifting the resin coat section in the axial direction with respect to the tubular core can be prevented.

In the roller, the groove section may be spirally formed in the outer circumferential face of the tubular core. With this structure, shifting the resin coat section with respect to the tubular core can be prevented.

The roller may further comprise a bearing being fitted in the tubular core. With this structure, the roller and the bearing can be easily integrated.

In the roller, the resin coat section may be made of DURACON, acetal copolymer, or composite resin including potassium titanate fibers. With this structure, the resin coat section is hard to be deformed, so that dynamic resistance of the roller can be reduced and the resin coat section is hard to be detached from the tubular core.

In the roller, the tubular core may be made of glass fiber-reinforced resin or metal. With this structure, the tubular core is hard to be deformed, so that dynamic resistance of the roller can be reduced and the resin coat section is hard to be detached from the tubular core.

In the roller, a small diameter section, whose inner diameter is shorter than that of the one end of the tubular core, may be formed in the tubular core, and the resin coat section may continuously coat the outer circumferential face of the other end part of the tubular core and an inner circumferential face of the small diameter section. With this structure, the resin coat section can easily continuously coat the outer circumferential face of the tubular core and the inner circumferential face of the small diameter section by the steps of: inserting an insertion member into the one end of the tubular core so as to close the one end side of the small diameter section; setting the tubular core in a die, which encloses the outer circumferential face and the both ends of the tubular core with a prescribed clearance; and filling a space enclosed by the tubular core, the die and the insertion member with molten resin so as to form the resin coat section on the surface of the tubular core.

In the roller, an intermediate diameter section, whose inner diameter is greater than that of the small diameter section and shorter than that of the one end of the tubular core, may be formed in the tubular core, and the resin coat section may continuously coat the outer circumferential face of the one end part of the tubular core and an inner circumferential face of the intermediate diameter section. With this structure, the resin coat section can easily continuously coat the outer circumferential face of the tubular core and the inner circumferential face of the intermediate diameter section by the above described steps.

The roller may further comprise a bearing being fitted in the intermediate diameter section.

The moving unit of the present invention comprises:
a rail being made of aluminum or aluminum alloy;
a moving body; and a roller being capable of rolling on the rail so as to move the moving body along the rail, and the roller comprises:
a tubular core having an outer circumferential face, in which a groove section is formed; and a resin coat section continuously coating the outer circumferential face of the tubular core, an inner face of the groove section, both ends of the tubular core and at least parts of an inner circumferential face thereof.

The method of producing a roller, which has: a tubular core having an outer circumferential face, in which a groove section is formed; and a resin coat section continuously coating the outer circumferential face of the tubular core, an inner face of the groove section, both ends of the tubular core and at least parts of an inner circumferential face thereof, wherein a small diameter section, whose inner diameter is shorter than that of the one end of the tubular core, is formed in the tubular core, and the resin coat section continuously coats the outer circumferential face of the other end part of the tubular core and an inner circumferential face of the small diameter section, comprises the steps of:

inserting an insertion member into the one end of the tubular core so as to close the one end side of the small diameter section;

setting the tubular core in a die, which encloses the outer circumferential face and the both ends of the tubular core with a prescribed clearance; and filling a space enclosed by the tubular core, the die and the insertion member with molten resin so as to form the resin coat section on the surface of the tubular core.

With this method, the one end of the small diameter section is closed by the insertion member, and the molten resin is poured thereinto. Therefore, the resin coat section, which continuously coats the outer circumferential face of the tubular core, the other end thereof and the inner circumferential face of the small diameter section, can be easily formed.

Another method of producing a roller, which has: a tubular core having an outer circumferential face, in which a groove section is formed; and a resin coat section continuously coating the outer circumferential face of the tubular core, an inner face of the groove section, both ends of the tubular core and at least parts of an inner circumferential face thereof, wherein a small diameter section, whose inner diameter is shorter than that of the one end of the tubular core, is formed in the tubular core, the resin coat section continuously coats the outer circumferential face of the other end part of the tubular core and an inner circumferential face of the small diameter section, an intermediate diameter section, whose inner diameter is greater than that of the small diameter section and shorter than that of the one end of the tubular core, is formed in the tubular core, and the resin coat section continuously coats the outer circumferential face of the one end of the tubular core and an inner circumferential face of the intermediate diameter section, comprises the steps of:

inserting an insertion member into the one end of the tubular core so as to contact the entire inner circumferential face of the intermediate diameter section;

setting the tubular core in a die, which encloses the outer circumferential face and the both ends of the tubular core with a prescribed clearance; and filling a space enclosed by the tubular core, the die and the insertion member with molten resin so as to form the resin coat section on the surface of the tubular core.

With this method, the molten resin fills the space formed between the outer circumferential face of the insertion member and the inner circumferential face of the one end of the tubular core, whose diameter is greater than that of the intermediate diameter section, so that the resin coat section, which continuously coats the outer circumferential face of the tubular core, the other end thereof and the inner circumferential face of the intermediate diameter section, can be easily formed.

In the method, a projection, which can be inserted into the small diameter section with a prescribed clearance from the inner circumferential face thereof, may be formed at a front end of the insertion member. By forming the projection, the resin coat section, which has the prescribed thickness, can be formed on the inner circumferential face of the small diameter section.

The roller of the present invention can be suitably used for a guide section of a moving unit capable of moving a heavy matter without enormously increasing rigidity of a rail. The roller is capable of reducing weight and production cost of the moving unit.

In the moving unit of the present invention, load applied to the rail can be reduced, so the rail made of aluminum or aluminum alloy can be used. Therefore, weight and production cost of the moving unit can be reduced. Further, the resin coat section of the roller is hard to be deformed and detached, so the moving unit is suitable for moving heavy matters.

By employing the production methods of the present invention, the roller of the present invention can be easily produced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE EMBODIMENTS

Preferred embodiments of the present invention will now be described in detail with reference to the accompanying drawings. Namely, the roller and the moving unit of the present invention and the method of producing the roller will be explained.

Figure 1:
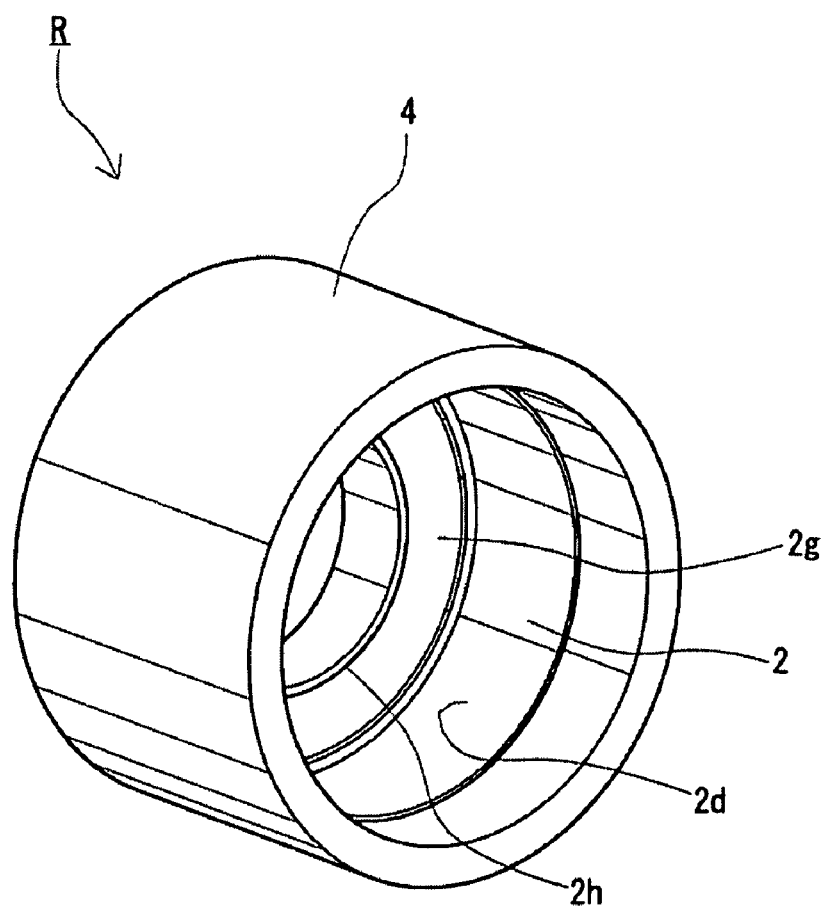
FIG. 1 is a perspective view of a roller relating to the present invention.
Figure 2A:
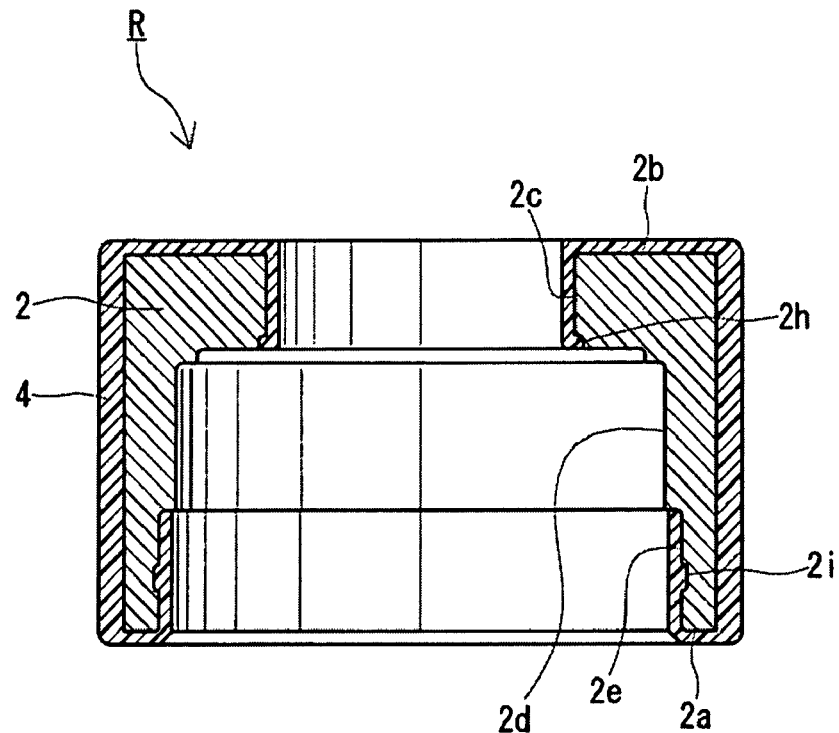
FIG. 2A is a longitudinal sectional view of the roller, wherein no bearing is fitted.
Figure 2B:
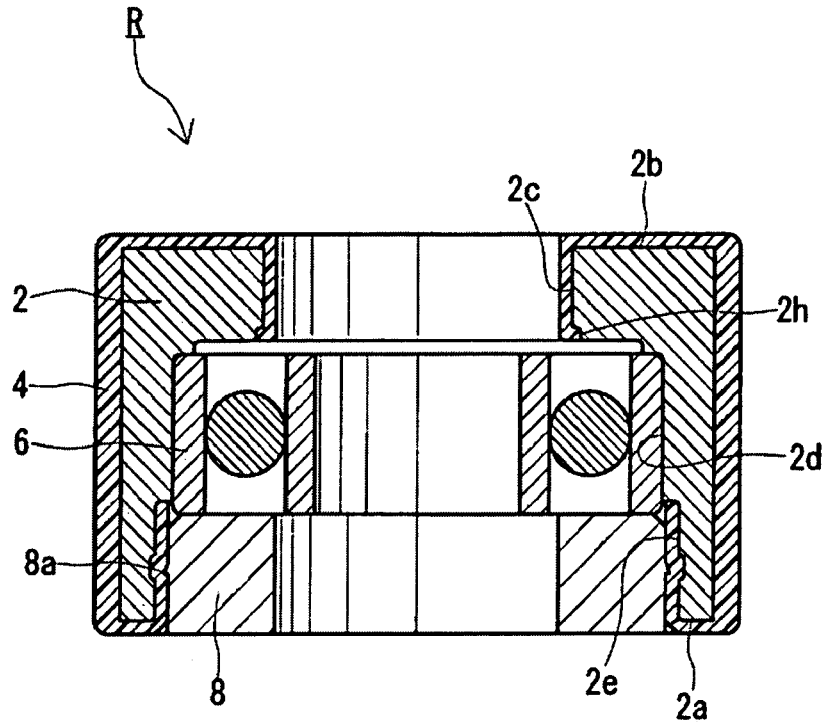
FIG. 2B is a longitudinal sectional view of the roller, wherein a bearing is fitted.

FIG. 1 is a perspective view of a roller R, and FIGS. 2A and 2B are longitudinal sectional views of the roller R.

As shown in FIGS. 1 and 2A, the roller R comprises: a tubular core 2; and a resin coat section 4 continuously coating an outer circumferential face of the tubular core 2, groove sections 2f (see FIGS. 3A and 3B) formed in the outer circumferential face thereof, both ends 2a and 2b of the tubular core 2 and parts of an inner circumferential face thereof. The resin core section 4 is integrally formed by resin molding.

Preferably, a thickness of the resin coat section 4 is about 0.5 mm.

The tubular core 2 is made of glass fiber-reinforced resin or metal.

Further, the resin coat section 4 is made of DURACON, acetal copolymer, or composite resin including potassium titanate fibers.

As shown in FIG. 2A, a small diameter section 2c, whose inner diameter is shorter than that of the one end 2a of the tubular core 2, is formed in the inner circumferential face of the tubular core 2. The resin coat section 4 continuously coats the outer circumferential face of the tubular core 2, the other end 2b thereof and an inner circumferential face of the small diameter section 2c.

A circular concave section 2h, whose inner diameter is greater than that of the small diameter section 2c, is formed along an inner edge of the small diameter section 2c located on the one end 2a side. The resin coat section 4 coats and engages with the concave section 2h.

An intermediate diameter section 2d, whose inner diameter is greater than that of the small diameter section 2c and shorter than that of the one end 2a, is formed in the inner circumferential face of the tubular core 2 between the both ends 2a and 2b. The resin coat section 4 continuously coats the outer circumferential face of the tubular core 2, the one end 2a thereof and the part of the inner circumferential face thereof (a large diameter section 2e).

A circular concave section 2i, whose inner diameter is greater than that of the large diameter section 2e, is formed in the large diameter section 2e. The resin coat section 4 coats and engages with the circular concave section 2i.

As shown in FIG. 2B, a bearing 6, whose diameter is equal to the inner diameter of the intermediate diameter section 2d, is fitted in the intermediate diameter section 2d of the completed roller R. Further, a retainer ring 8, which retains the bearing 6, is fitted in the large diameter section 2e. A circular projection 8a, which bites the resin coat section 4 coating the inner circumferential face of the large diameter section 2e, is formed in the outer circumferential face of the retainer ring 8.

Figure 3A:
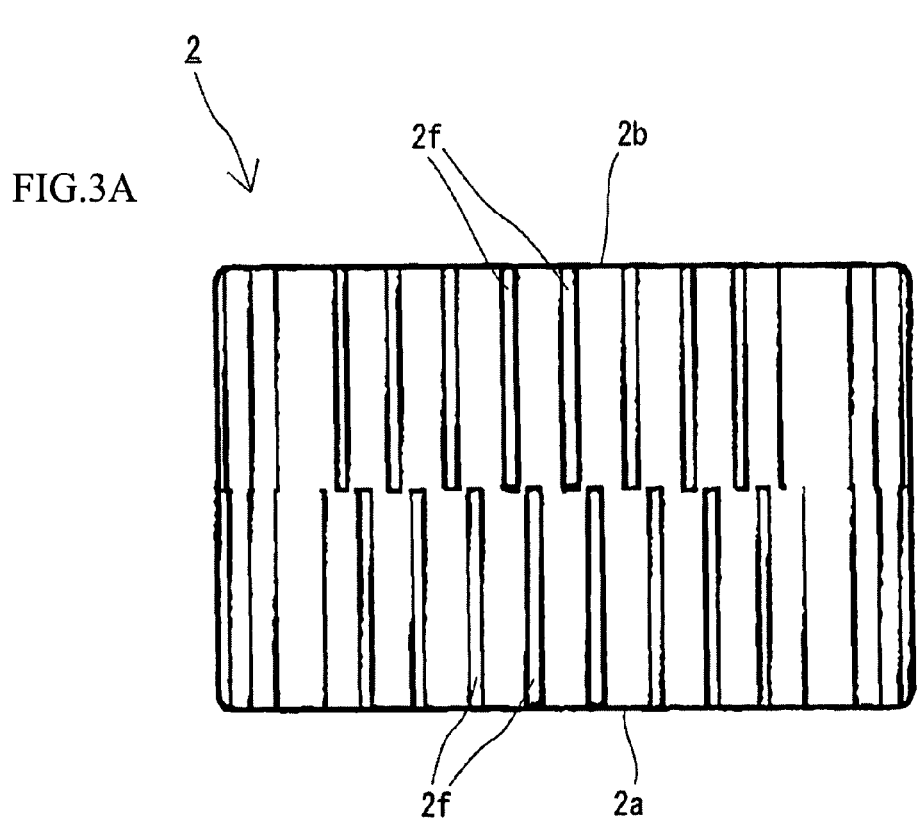
FIG. 3A is a side view of a core coated with no resin coat section.
Figure 3B:
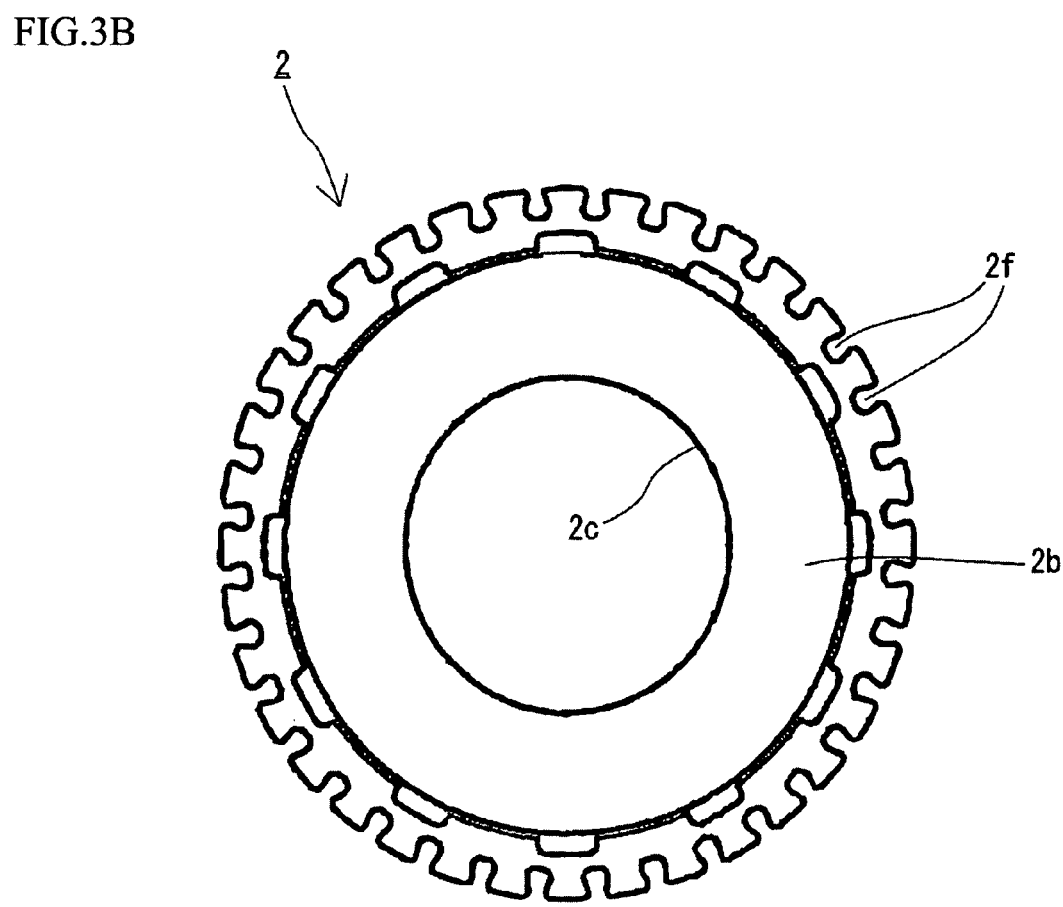
FIG. 3B is an end view of the core coated with no resin coat section.

FIG. 3A is a side view of the tubular core 2, which is not coated with the resin coat section 4, and FIG. 3B is an end view of the tubular core 2, which is not coated with the resin coat section 4, seen from the other end 2b side.

As shown in FIGS. 3A and 3B, a plurality of the groove sections 2f are formed in the outer circumferential face of the tubular core 2.

The groove sections 2f are arranged in the circumferential direction of the tubular core 2 and extended in the axial direction thereof, and the groove sections 2f are constituted by first groove sections, which are provided on the one end 2a side, and second groove sections, which are provided on the other end 2b side.

As shown in FIG. 3A, the first groove sections 2f and the second groove sections 2f are alternately arranged in the circumferential direction of the tubular core 2. Therefore, a length of each of the groove sections 2f is shorter than that of the tubular core 2.

Figure 4:
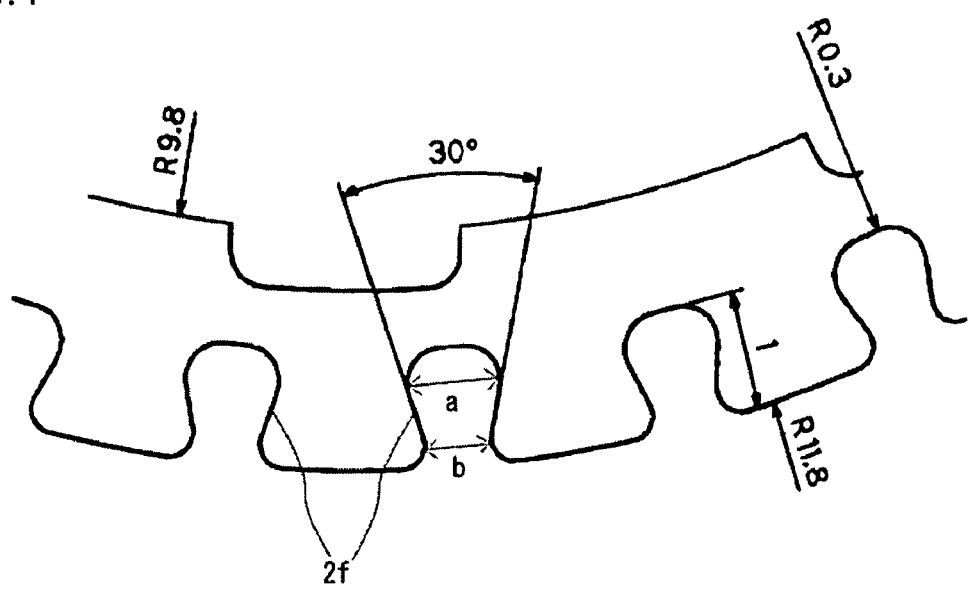
FIG. 4 is an enlarged view of an outer part of the core coated with no resin coat section.

FIG. 4 is an enlarged view of an outer part of the other end 2b of the tubular core 2, wherein shapes of the groove sections 2f are shown.

As shown in FIG. 4, width a of an inner part of each the groove section 2f is wider than width b of an opening part thereof. With this structure, the resin coat section 4 can securely engage with the groove sections 2f, so that the resin coat section 4 can be securely attached to the tubular core 2.

For example, in the present embodiment, a depth of each groove section 2f is about 1 mm; a distance between side faces of each groove section 2f is gradually increased toward the inmost part thereof; and an inclination angle of each side face is about 30 degrees. A sectional shape of the inmost part of each groove section 2f is an arc shape, whose curvature radius is about 0.3 mm. Note that, a radius of the outer circumferential face of the tubular core 2 is about 11.8 mm.

In the roller R of the present embodiment, the resin coat section 4 continuously coats the outer circumferential face of the tubular core 2 to the inner circumferential face thereof via the both ends 2a and 2b. Further, the resin coat section 4 fills the groove sections 2f. Therefore, even if the resin coat section 4 is thin, e.g., about 0.5 mm, the resin coat section 4 never detaches from the tubular core 2. Especially, the inner width a of each groove section 2f is wider than the width b of the opening part thereof, so that the groove sections 2f bite the resin coat section 4. Therefore, the resin coat section 4 can be securely held by the tubular core 2.

Since the groove sections 2f are extended in the axial direction of the tubular core 2, shifting the resin coat section 4 in the circumferential direction with respect to the tubular core 2 can be prevented. And, the first groove sections 2f, which are provided on the one end side, and the second groove sections 2f, which are provided on the other end side, are alternately arranged in the circumferential direction, so shifting the resin coat section 4 in the axial direction with respect to the tubular core 2 can be prevented.

Further, the concave sections 2h and 2i, which are formed in the inner circumferential face of the tubular core 2, are coated and engaged with the resin coat section 4, so that the resin coat section 4 never detaches from the inner circumferential face of the tubular core 2.

Since the resin coat section 4 is made of DURACON, acetal copolymer, or composite resin including potassium titanate fibers, the resin coat section 4 is hard to be deformed and detached. Further, the resin coat section 4 can make dynamic resistance of the roller R small.

Since the tubular core 2 is made of glass fiber-reinforced resin or metal, the tubular core 2 is hard to be deformed, dynamic resistance during the moving action can be made small and the resin coat section 4 never detaches from the tubular core 2.

In the roller R of the present embodiment, the surface of the tubular core 2, which is made of the high rigidity material, is coated with the thin resin coat section 4, e.g., about 0.5 mm. Further, the resin coat section 4 never detaches from the tubular core 2. Therefore, deformation of the resin coat section 4 can be restrained even if heavy weight is applied. Further, load applied to a rail can be made small.

Figure 5:
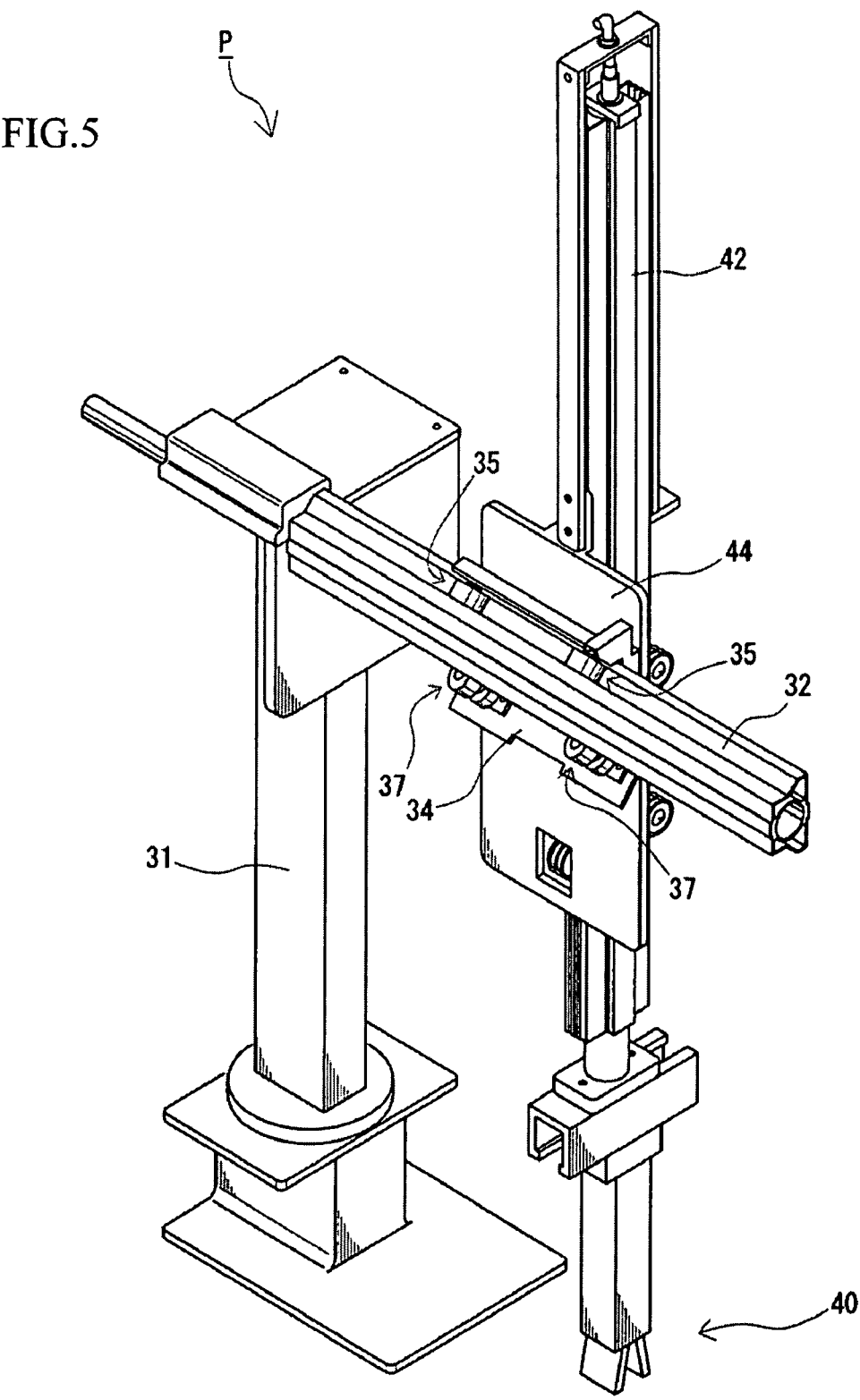
FIG. 5 is a perspective view of an apparatus for discharging a molded product, which includes a moving unit relating to the present invention.
Figure 6:
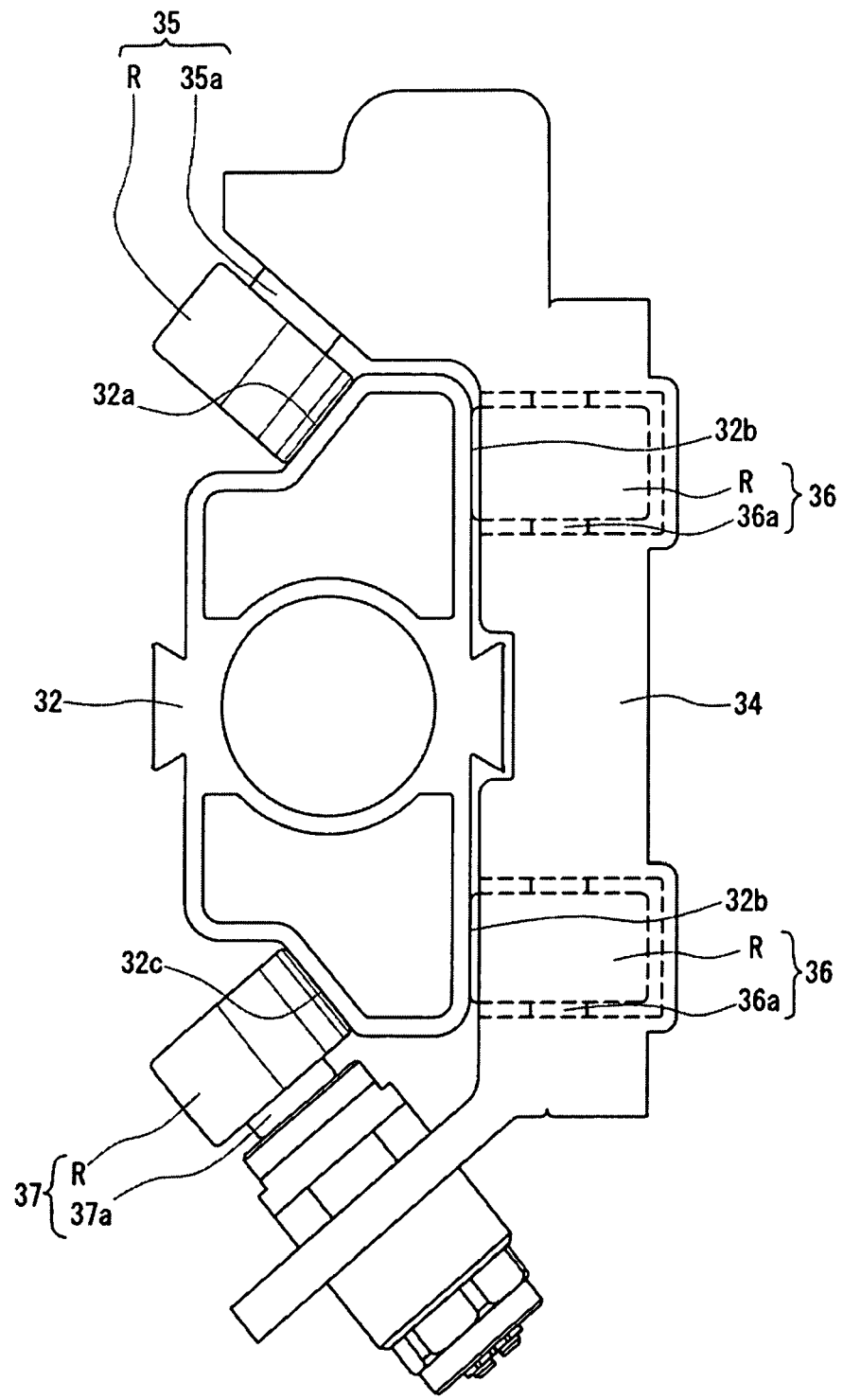
FIG. 6 is an explanation view of the moving unit.

FIG. 5 is a perspective view of an apparatus P for discharging a molded product, which includes moving units. FIG. 6 is an explanation view of a horizontal moving unit, which has the rollers R, seen from a longitudinal end of a horizontal rail.

The apparatus P comprises: a base 31; a chucking unit 40 capable of chucking a molded product; the horizontal moving unit for horizontally moving the chucking unit 40; and a vertical moving unit for vertically moving the chucking unit 40.

(Horizontal Moving Unit)

The horizontal moving unit of the present embodiment comprises: a horizontal rail 32 horizontally attached to the base 31; a horizontal moving body 34 being horizontally moved along the horizontal rail 32; and roller units 35, 36 and 37 (see FIG. 6), which respectively contact and roll on guide faces 32a, 32b and 32c of the horizontal rail 32 and each of which has the roller R.

The horizontal rail 32 may be formed by, for example, extruding aluminum alloy.

As shown in FIG. 6, the roller units 35, 36 and 37 respectively have bases 35a, 36a and 37a, which are fixed to the horizontal moving body 34, and the rollers R, which are rotatably attached to the bases 35a, 36a and 37a and contact the guide faces 32a, 32b and 32c of the horizontal rail 32. The bases 35a, 36a and 37a are respectively connected to the bearings 6 (see FIG. 2B) of the rollers R, and the rollers R are capable of smoothly rotating with respect to the bases 35a, 36a and 37a.

As shown in FIG. 6, the horizontal moving body 34 has a U-shaped section taken along a line perpendicular to the moving direction of the horizontal moving body 34, which is moved along the horizontal rail 32. The horizontal moving body 34 covers one side face, a part of an upper face and a part of a lower face of the horizontal rail 32.

The roller units 35 and 37 are provided in the vicinity of an upper end and a lower end of the U-shape of the horizontal moving body 34, and the roller units 36 are provided to a mid part of the U-shape thereof.

Two of the roller units (35 and 37) and two of the roller units 36 are arranged in the moving direction of the horizontal moving body 34, which is moved along the horizontal rail 32. On the other hand, two of the roller units 36 are arranged in the direction perpendicular to the moving direction of the horizontal moving body 34, and another two of the roller units 36 are arranged in the moving direction thereof. Namely, four of the roller units 36 are provided.

In the horizontal moving unit, each of the rollers R contacts and rolls on the horizontal rail 32, so that the horizontal moving body 34 can be moved along the horizontal rail 32.

(Vertical Moving Unit)

As shown in FIG. 5, the vertical moving unit is provided to the horizontal moving body 34.

In the vertical moving unit, a rail 42 is vertically moved with respect to the horizontal moving body 34. Namely, the rail 42 of the vertical moving unit is vertically moved with respect to a plate member 44, which is attached to the horizontal moving body 34.

Note that, details of the vertical moving unit will be omitted.

In the apparatus P of the present embodiment, the surfaces of the rollers R are composed of the resin, so that the horizontal rail 32 is not abraded and damaged. Therefore, the horizontal rail 32 may be made of a light material, e.g., aluminum, and weight of the apparatus P can be reduced.

Further, weight and production cost of a supporting mechanism, which supports the horizontal rail 32, etc., can be reduced.

Successively, a method of producing the roller R will be explained. The roller R can be formed by a known insert-molding process.

Figure 7A:
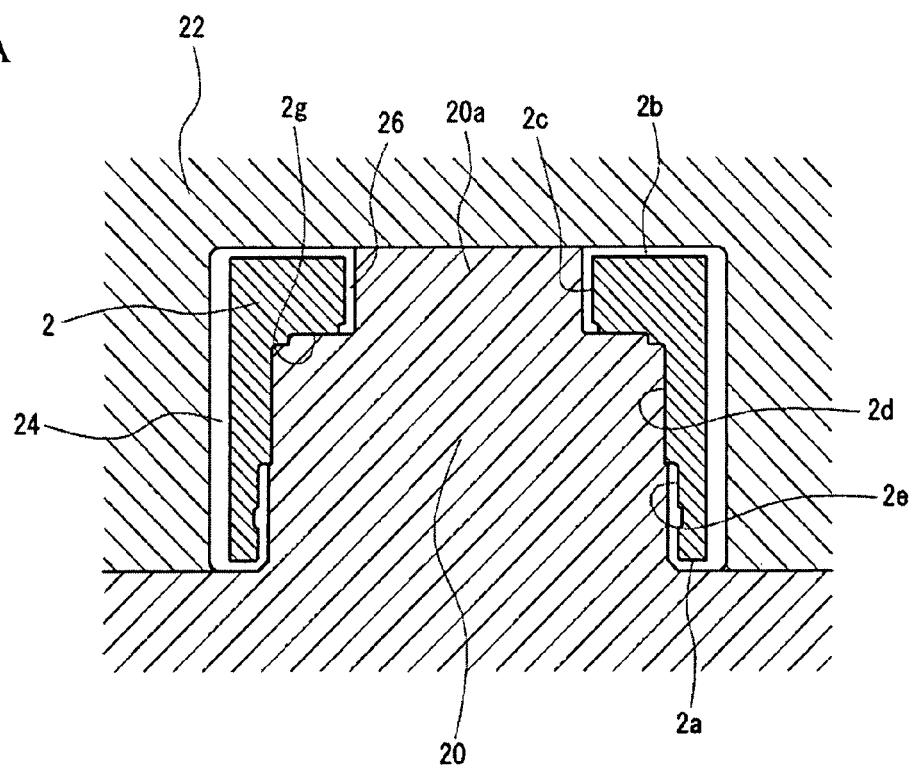
FIG. 7A is a sectional view of a molding die, wherein no molten resin fills a space.

Firstly, as shown in FIG. 7A, an insertion member 20 is inserted into the tubular core 2 from the one end 2a side so as to close the one end 2a side of the small diameter section 2c and contacts the entire inner circumferential face of the intermediate diameter section 2d, and then the tubular core 2, in which the insertion member 20 has been inserted, is set in a molding die 22, which encloses the outer circumferential face and the both ends 2a and 2b of the tubular core 2 with a prescribed clearance 24. At that time, the one end 2a side of the small diameter section 2c is closed by the insertion member 20, and the insertion member 20 contacts the inner circumferential face of the intermediate diameter section 2d and a side wall section 2g between the small diameter section 2c and the intermediate diameter section 2d.

Note that, a projection 20a, which can be inserted into the small diameter section 2c with a prescribed clearance 26 from the inner circumferential face thereof, is formed at a front end of the insertion member 20.

Figure 7B:
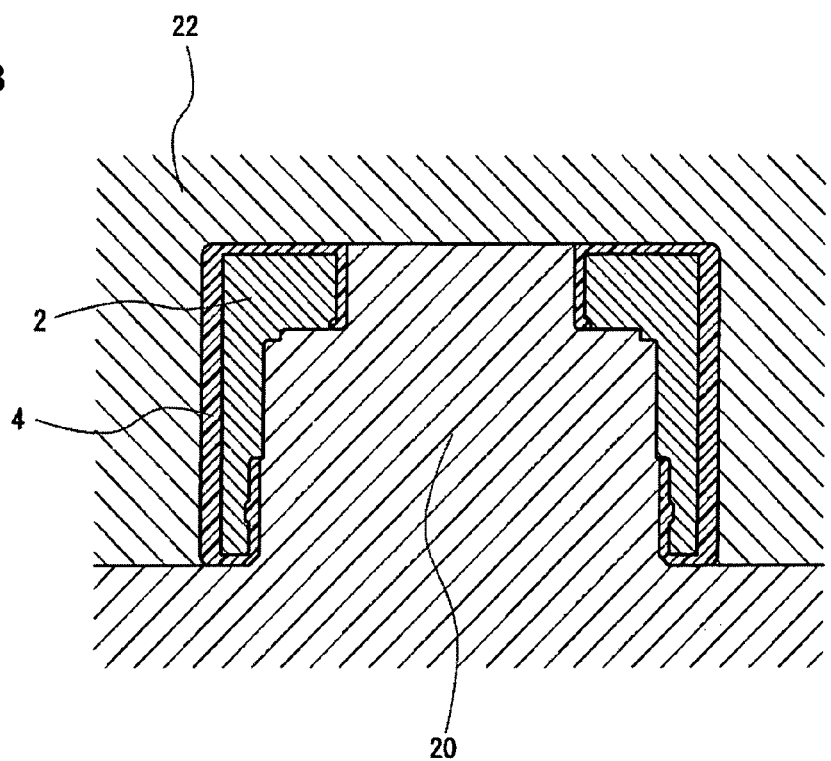
FIG. 7B is a sectional view of the molding die, wherein molten resin fills the space.
Figure 8:
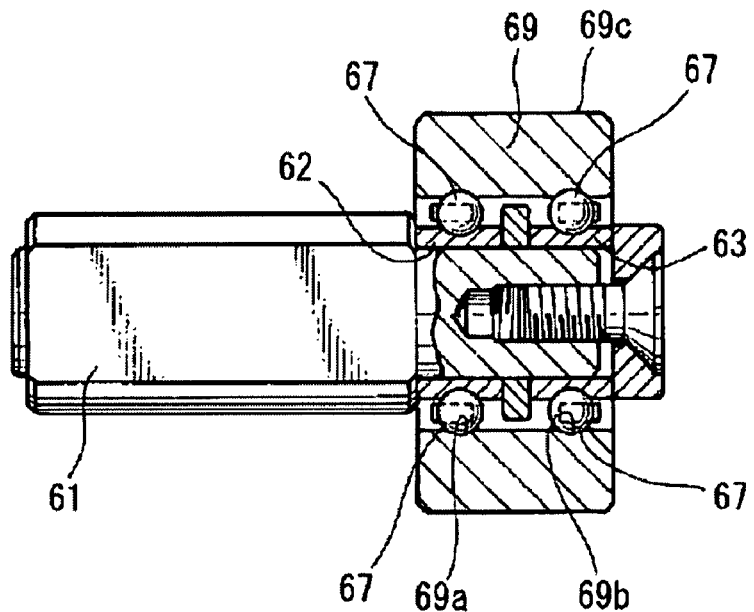
FIG. 8 is a sectional view of the conventional roller unit.
Figure 9:
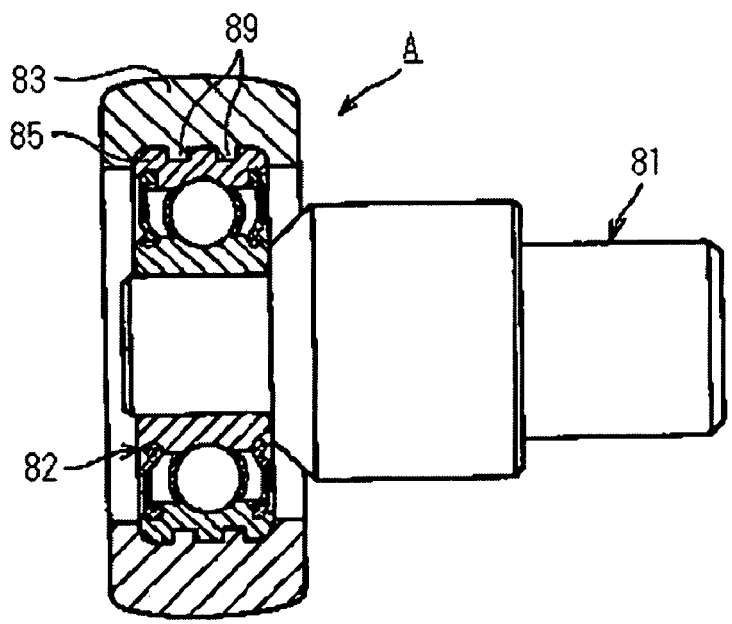
FIG. 9 is a sectional view of another conventional roller unit.

Molten resin is poured into the clearances or spaces 24 and 26, which are enclosed by the tubular core 2, the molding die 22 and the insertion member 20, so that the resin coat section 4 can be formed on the surface of the tubular core 2 (see FIG. 7B).

By the above described method, the molten resin fills the small diameter section 2c, which is formed between the other end 2b and the intermediate diameter section 2d, so that the resin coat section 4, which continuously coats the outer circumferential face of the tubular core 2, the other end 2b thereof and the inner circumferential face of the small diameter section 2c, can be formed.

Further, the molten resin fills a space between an outer circumferential face of the insertion member 20 and the inner circumferential face of the large diameter section 2e, whose inner diameter is greater than that of the intermediate diameter section 2d, so that the resin coat section 4 can further continuously coats the outer circumferential face of the tubular core 2, the one end 2a thereof and the inner circumferential face of the large diameter section 2e.

By the projection 20a, the resin coat section 4, whose thickness is equal to the clearance 26, can be formed on the inner circumferential face of the small diameter section 2c.

Note that, the insertion member 20 contacts the inner circumferential face of the intermediate diameter section 2d and the side wall section 2g between the small diameter section 2c and the intermediate diameter section 2d, so that no resin sticks thereto.

By forming the small diameter section 2c, the inter mediate section 2d and the large diameter section 2e of the tubular core 2 and by using the insertion member 20, the resin coat section 4, which continuously coats the outer circumferential face of the tubular core 2, the both ends 2a and 2b thereof and at least the parts of the inner circumferential face thereof, can be easily formed by the above described method.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A moving unit comprising:
a rail being made of aluminum or an aluminum alloy;
a moving body having a weight of 50 kg to several hundred kg; and
a roller being connected to said moving body, said roller contacting said rail and rolling thereon,
wherein said roller comprises:
a tubular core having an outer circumferential face in which a plurality of groove sections are formed;
wherein the plurality of groove sections are arranged in the circumferential direction of said tubular core and extended in the axial direction thereof,
the groove sections are constituted by first groove section, which are provided on the one end side, and second groove sections, which are provided on the other end side, and
the first groove sections and the second groove sections are alternately arranged in the circumferential direction of said tubular core; and
a resin coat section continuously coating the outer circumferential face of said tubular core, an inner face of the groove section, both ends of said tubular core and at least parts of an inner circumferential face thereof,
wherein said tubular core is made of glass fiber-reinforced resin or metal,
wherein said resin coat section is made of DURACON, acetal copolymer, or composite resin including potassium titanate fibers, said resin coat section has a thickness of about 0.5 mm, and
wherein said moving body is moved and guided along said rail by rolling said roller on said rail.

2. The moving unit according to claim 1,
wherein a width of an inner part of the groove section is wider than that of an opening part thereof.

3. The moving unit according to claim 1,
wherein a plurality of the groove sections are arranged in the circumferential direction of said tubular core and extended in the axial direction thereof, and
a length of each of the groove sections is shorter than that of said tubular core.

4. The moving unit according to claim 1,
wherein the groove section is spirally formed in the outer circumferential face of said tubular core.

5. The moving unit according to claim 1,
further comprising a bearing being fitted in said tubular core.

6. The moving unit according to claim 1,
wherein a small diameter section, whose inner diameter is shorter than that of the one end of said tubular core, is formed in said tubular core, and
said resin coat section continuously coats the outer circumferential face of the other end part of said tubular core and an inner circumferential face of the small diameter section.

7. The moving unit according to claim 6,
wherein an intermediate diameter section, whose inner diameter is greater than that of the small diameter section and shorter than that of the one end of said tubular core, is formed in said tubular core, and
said resin coat section continuously coats the outer circumferential face of the one end part of said tubular core and an inner circumferential face of the intermediate diameter section.

8. The moving unit according to claim 6,
wherein an intermediate diameter section, whose inner diameter is greater than that of the small diameter section and shorter than that of the one end of said tubular core, is formed in said tubular core, said resin coat section continuously coats the outer circumferential face of the one end part of said tubular core and an inner circumferential face of the intermediate diameter section, and further comprising a bearing being fitted in the intermediate diameter section.

9. A method of producing a roller of a moving unit, which has: a tubular core having an outer circumferential face, in which a plurality of groove sections are formed;

wherein the plurality of groove sections are arranged in the circumferential direction of said tubular core and extended in the axial direction thereof, the groove sections are constituted by first groove section, which are provided on the one end side, and second groove sections, which are provided on the other end side, and the first groove sections and the second groove sections are alternately arranged in the circumferential direction of said tubular core; and a resin coat section continuously coating the outer circumferential face of said tubular core, an inner face of the groove section, both ends of said tubular core and at least parts of an inner circumferential face thereof, wherein a small diameter section, whose inner diameter is shorter than that of the one end of said tubular core, is formed in said tubular core, and said resin coat section continuously coats the outer circumferential face of the other end part of said tubular core and an inner circumferential face of the small diameter section, comprising the steps of:

inserting an insertion member into the one end of said tubular core so as to close the one end side of the small diameter section;

setting said tubular core in a die, which encloses the outer circumferential face and the both ends of said tubular core with a prescribed clearance; and filling a space enclosed by said tubular core, the die and the insertion member with molten resin so as to form the resin coat section on the surface of said tubular core.

10. The method according to claim 9, wherein a projection, which can be inserted into the small diameter section with a prescribed clearance from the inner circumferential face thereof, is formed at a front end of the insertion member.

11. A method of producing a roller of a moving unit, which has: a tubular core having an outer circumferential face, in which a plurality of groove sections are formed;

wherein the plurality of groove sections are arranged in the circumferential direction of said tubular core and extended in the axial direction thereof, the groove sections are constituted by first groove section, which are provided on the one end side, and second groove sections, which are provided on the other end side, and the first groove sections and the second groove sections are alternately arranged in the circumferential direction of said tubular core; and a resin coat section continuously coating the outer circumferential face of said tubular core, an inner face of the groove section, both ends of said tubular core and at least parts of an inner circumferential face thereof, wherein a small diameter section, whose inner diameter is shorter than that of the one end of said tubular core, is formed in said tubular core, said resin coat section continuously coats the outer circumferential face of the other end part of said tubular core and an inner circumferential face of the small diameter section, an intermediate diameter section, whose inner diameter is greater than that of the small diameter section and shorter than that of the one end of said tubular core, is formed in said tubular core, and said resin coat section continuously coats the outer circumferential face of the one end of said tubular core and an inner circumferential face of the intermediate diameter section, comprising the steps of:

inserting an insertion member into the one end of said tubular core so as to contact the entire inner circumferential face of the intermediate diameter section;

setting said tubular core in a die, which encloses the outer circumferential face and the both ends of said tubular core with a prescribed clearance; and filling a space enclosed by said tubular core, the die and the insertion member with molten resin so as to form the resin coat section on the surface of said tubular core.

* * * * *